(12) United States Patent
Rose et al.

(10) Patent No.: US 7,627,858 B2
(45) Date of Patent: *Dec. 1, 2009

(54) VERIFICATION OF STREAM ORIENTED LOCALE FILES

(75) Inventors: Daniel Alan Rose, Markham (CA); Baldev Singh Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 823 days.

This patent is subject to a terminal disclaimer.

(21) Appl. No.: 10/875,851

(22) Filed: Jun. 24, 2004

(65) Prior Publication Data

US 2005/0125780 A1 Jun. 9, 2005

(30) Foreign Application Priority Data

Dec. 3, 2003 (CA) .................................. 2452077

(51) Int. Cl.
*G06F 9/44* (2006.01)
*G06F 17/20* (2006.01)

(52) U.S. Cl. .......................................... 717/125; 704/8
(58) Field of Classification Search ......... 717/124–125, 717/126; 704/8; 715/532, 264
See application file for complete search history.

(56) References Cited

U.S. PATENT DOCUMENTS

| | | | | |
|---|---|---|---|---|
| 3,576,541 A | * | 4/1971 | Kwan et al. | .................... 714/32 |
| 4,930,077 A | * | 5/1990 | Fan | ................. 704/8 |
| 5,675,818 A | * | 10/1997 | Kennedy | ........................ 704/8 |
| 5,899,990 A | | 5/1999 | Maritzen et al. | |
| 5,923,892 A | | 7/1999 | Levy | |
| 5,925,123 A | | 7/1999 | Tremblay et al. | |
| 5,937,193 A | | 8/1999 | Evoy | |

(Continued)

FOREIGN PATENT DOCUMENTS

JP 2006059108 A * 3/2006

OTHER PUBLICATIONS

John O'Conner, "Java Internationalization: An Overview", Jul. 1998, Sun Microsystems, Accessed online on Dec. 7, 2007 at <http://java.sun.com/developer/technicalArticles/Intl/IntlIntro/>, 5 pages.*

(Continued)

*Primary Examiner*—James Rutten
(74) *Attorney, Agent, or Firm*—Mark S. Walker; Jill A. Poimboeuf; Robert C. Rolnik (57) ABSTRACT

A computer implemented method for preparing a plurality of stream oriented locale files for verification is provided. In an embodiment there is a method comprising obtaining at least one of the plurality of stream oriented locale files as input, determining more than one of a plurality of stream oriented locale files, merging the plurality of stream oriented locale files into a stream oriented locale file, otherwise; locating a respective portion of the stream oriented locale file, creating an output portion from the respective portion by selectively invoking a process based on the respective portion, storing the output portion in a memory and formatting the output portion, stored in the memory, into a formatted string. The formatted string may then be viewed by a user verifier or programmatically verified using reference strings. This form of verification is performed using typical system utilities and scripting services.

2 Claims, 8 Drawing Sheets

U.S. PATENT DOCUMENTS

| | | |
|---|---|---|
| 5,937,411 A | 8/1999 | Becker |
| 6,003,050 A | 12/1999 | Silver et al. |
| 6,029,000 A | 2/2000 | Woolsey et al. |
| 6,066,181 A | 5/2000 | DeMaster |
| 6,067,558 A | 5/2000 | Wendt et al. |
| 6,260,187 B1* | 7/2001 | Cirne ........................ 717/110 |
| 6,275,790 B1* | 8/2001 | Yamamoto et al. ............. 704/8 |
| 6,275,978 B1* | 8/2001 | Bell ........................... 717/143 |
| 6,393,437 B1* | 5/2002 | Zinda et al. ................. 707/201 |
| 6,425,123 B1* | 7/2002 | Rojas et al. ................. 717/136 |
| 6,530,039 B1* | 3/2003 | Yang ............................ 714/38 |
| 6,862,616 B1* | 3/2005 | Tompkins ................... 709/223 |
| 6,938,259 B2* | 8/2005 | McGeorge, Jr. ............. 719/313 |
| 6,961,931 B2* | 11/2005 | Fischer ....................... 717/168 |
| 7,024,365 B1* | 4/2006 | Koff et al. ................. 704/270.1 |
| 7,150,010 B1* | 12/2006 | Ringseth et al. ............. 717/140 |
| 2003/0084401 A1* | 5/2003 | Abel et al. ................. 715/501.1 |
| 2003/0097650 A1* | 5/2003 | Bahrs et al. ................. 717/124 |
| 2003/0110469 A1* | 6/2003 | Jackson ...................... 717/113 |
| 2003/0131320 A1* | 7/2003 | Kumhyr et al. ............. 715/536 |
| 2005/0050155 A1* | 3/2005 | McGee et al. ............... 709/213 |

OTHER PUBLICATIONS

"Stream files in the integrated file system", Jun. 22, 2008, IBM, iSeries Information Center, accessed from <http://publib.boulder.ibm.com/iseries/v5r1/ic2924/info/ifs/rzaaxmststmfile.htm#HDRSTMFILE>.*

* cited by examiner

VERIFICATION OF STREAM ORIENTED LOCALE FILES

FIELD OF THE INVENTION

This present invention relates generally to localization values in a computer resource file, and more particularly to verification of stream oriented locale files.

BACKGROUND OF THE INVENTION

In the computer software marketing and distribution industry, it is advantageous to make computer software available for use that reflects the language and culture of the intended users. A locale file is a computer resource file typically made available by a developer of a software application to assist in accomplishing this. A locale file may include a combination of specifications required to configure a software application program for a particular geographic and cultural market. These specifications typically include a language specification intended to be used to determine and control linguistic manipulation of character strings within the application program. In addition specifications for countries, regions and territories (collectively referred to herein as "country") define cultural conventions that may vary with languages, cultures or across countries. An example of a cultural convention is a date format identifying in which order the numerals representing day, month and year appear. Other configuration preferences, such as those used to specify mail settings or favorite icons are known in the art, but are typically not included in locale files but may be included in other forms of personalization support.

Locale files are usually processed into a form which can be readily used by an application program. Compilation of a source form of a locale file is one typical means of producing an object which can be accessed by an application program needing the information provided by the locale file.

Ensuring accurate computer application program processing of information according to local cultural and geographical preferences relies on correct specifications being provided in a locale file for a given combination of language and country. In order to ensure the accuracy of specifications which are referenced by application programs, it is highly desirable to have verified localization specifications incorporated in a locale file.

Current practice in the Java programming environment includes an arrangement of segments of a predetermined syntax of stream oriented locale files containing localization specifications, for use by application programs. The practice also relies on skilled programmers to codify those specifications into a system unique definition (Java in this case) representing the requirements. In some cases agreement among programmers has caused certain values to be used in these locale files in the absence of values actually representing legitimate country requirements for programmer convenience.

Difficulties may further occur when communicating the specifications coded in a system specific form, such as Java coding, to users who have been requested to verify values, as the users may have become confused by the system format itself. The expectation that verifiers would understand the system format was not necessarily well founded as many could not understand the codified version. Additionally, these users were expected to have and use the programming environment of the system specific form to perform the actual resource specification verification.

Inaccuracies related to a locale object ("compiled or executable" form of a locale file as used by an application program) and its associated locale file may be indicated when the formatted output of the application program using that particular locale object is found to be incorrect. The locale file then needs to be corrected with appropriate changes, verified again and a new locale object built.

Verifying users may perform a visual inspection of the output of an application program that used a locale object or the program output may also be compared programmatically with previously stored reference values. It may be appreciated that either of these iterative processes can require a significant amount of time and effort to obtain desired results.

The current practice of updating the locale file and re-testing may also be error prone. Changes to the locale file may often introduce new errors, not related to language or culture specifications themselves, as the changes may have been made by the verifiers (unskilled programmers). Changes may have been suggested in error due to the confusion of verifiers during interpretation of the locale file as stated earlier. The specifications, as used in computer processing, may have been misunderstood by those verifiers not skilled in the programming art, but expert in the usage of the values themselves. The specifications may also have been created with values inserted where none were required, such as abbreviated day names where local custom does not use such short forms, by programmers not aware of the actual values. Perhaps a desire to have consistent locale files by including values where none were required may have overshadowed the need for correct resource information. In such cases form may have outweighed function.

The verification process may require the use of a different programming environment than the one in which the locale resource was intended to be used. For example, performing the verification on a workstation platform without Java support, for a locale file intended to be used on a mainframe with such support. In such cases, the locale object and related programming interfaces of the mainframe platform cannot be used directly during the verification process on the workstation platform.

It is therefore desirable to have a capability for verifying the values used in the specifications contained in locale file, in an easier more efficient manner.

SUMMARY OF THE INVENTION

Embodiments of the present invention are provided for verifying specifications found in a locale file such as that used in the Java programming environment, independent of that Java environment. A separation of tasks typically allows a programmer to quickly add or modify required values, while allowing a skilled verifier or program to determine the accuracy of the file content without concern for the program syntax of the locale file. The use of standard system utilities for comparing, formatting and presenting removes a dependency on an environment specific to the resource file of interest. Standard scripting facilities typically found in systems are used to collect values from the locale file and apply necessary logic in conjunction with additional resource information to create intermediate stored values. These intermediate stored values are then formatted for further processing during verification. Manual verification, using skilled users knowledgeable in local country requirements, or programmatic verification, using stored reference values, may be used to compare and verify the accuracy of generated output.

An embodiment of the present invention may be employed to show the verifying user a final result in which potential errors may be noticed rather than requiring verifiers to walk through programming language code samples. Corrective active action may then be taken, triggered by such notification in a visual form (assuming a user is requested to verify the output). Results provided by embodiments of the invention typically afford easier maintenance of a locale file.

In accordance with an aspect of the present invention there is provided a computer implemented method for preparing a plurality of stream oriented locale files for verification, the method comprising the steps of obtaining at least one of said plurality of stream oriented locale files as input and determining more than one of the plurality of stream oriented locale files, merging the more than one of the plurality of stream oriented locale files into one stream oriented locale file, otherwise; locating a respective portion of the stream oriented locale file. Then creating an output portion from the respective portion by selectively invoking a process based on the respective portion, storing the output portion in a memory and formatting the output portion, stored in the memory, into a formatted string for output.

According to another aspect of the present invention, there is provided a system for preparing a plurality of stream oriented locale files for verification, the system comprising means for obtaining at least one of the plurality of stream oriented locale files as input, means for determining more than one of the plurality of stream oriented locale files, and merging the more than one of the plurality of stream oriented locale files into one stream oriented locale file, means for locating a respective portion of said stream oriented locale file, means for creating an output portion from said respective portion by selectively invoking a process based on said respective portion, means for storing said output portion in a memory, and means for formatting said output portion, stored in said memory, into a formatted string for output.

According to yet another aspect of the present invention, there is provided a computer program product having a computer readable medium tangibly embodying computer readable program code for instructing a computer to perform the method steps of: obtaining at least one of said plurality of stream oriented locale files as input and determining more than one of the plurality of stream oriented locale files, merging the more than one of the plurality of stream oriented locale files into one stream oriented locale file, otherwise; locating a respective portion of the stream oriented locale file. Then creating an output portion from the respective portion by selectively invoking a process based on the respective portion, storing the output portion in a memory and formatting the output portion, stored in the memory, into a formatted string for output.

According to get another aspect of the invention a signal bearing medium having computer readable signals tangibly embodying computer readable program code for instructing a computer to provide means for obtaining at least one of the plurality of stream oriented locale files as input, means for determining more than one of the plurality of stream oriented locale files, and merging the more than one of the plurality of stream oriented locale files into one stream oriented locale file, means for locating a respective portion of said stream oriented locale file, means for creating an output portion from said respective portion by selectively invoking a process based on said respective portion, means for storing said output portion in a memory, and means for formatting said output portion, stored in said memory, into a formatted string for output.

According to yet another aspect of the present invention, there is provided a computer program product having a computer readable medium tangibly embodying computer readable program code for instructing a computer to provide means for obtaining at least one of the plurality of stream oriented locale files as input, means for determining more than one of the plurality of stream oriented locale files, and merging the more than one of the plurality of stream oriented locale files into one stream oriented locale file, means for locating a respective portion of said stream oriented locale file, means for creating an output portion from said respective portion by selectively invoking a process based on said respective portion, means for storing said output portion in a memory, and means for formatting said output portion, stored in said memory, into a formatted string for output.

A signal bearing medium having computer readable signals tangibly embodying computer readable program code for instructing a computer to perform the method steps of: obtaining at least one of said plurality of stream oriented locale files as input and determining more than one of the plurality of stream oriented locale files, merging the more than one of the plurality of stream oriented locale files into one stream oriented locale file, otherwise; locating a respective portion of the stream oriented locale file. Then creating an output portion from the respective portion by selectively invoking a process based on the respective portion, storing the output portion in a memory and formatting the output portion, stored in the memory, into a formatted string for output.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described, by way of example, with reference to the accompanying drawings, in which.

Like reference numerals refer to corresponding components and steps throughout the drawings. It is to be expressly understood that the description and the drawings are only for the purpose of illustration and as an aid to understanding, and are not intended as a definition of the limits of the invention.

DETAILED DESCRIPTION

Figure 1:
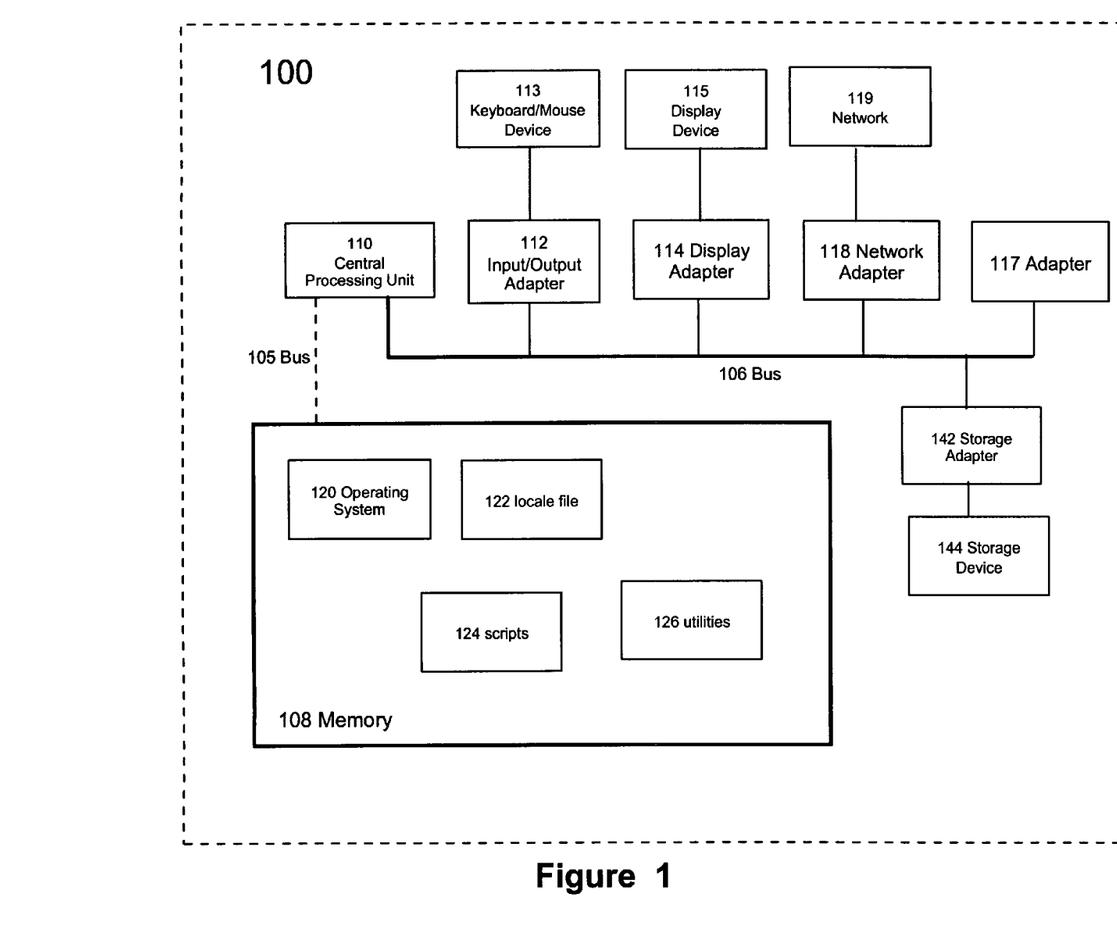
FIG. 1 is a hardware overview of a computer system, exemplary of an embodiment of the present invention.

FIG. 1 depicts, in a simplified block diagram, a computer system 100 suitable for implementing embodiments of the present invention. Computer system 100 has a central processing unit (CPU) 110, which is a programmable processor for executing programmed instructions, such as instructions contained in utilities (utility programs) 126 stored in memory 108. Memory 108 can also include hard disk, tape or other storage media. While a single CPU is depicted in FIG. 1, it is understood that other forms of computer systems can be used to implement the invention, including multiple CPUs. It is also appreciated that the present invention can be implemented in a distributed computing environment having a plurality of computers communicating via a suitable network 119, such as the Internet.

CPU 110 is connected to memory 108 either through a dedicated system bus 105 and/or a general system bus 106. Memory 108 can be a random access semiconductor memory for storing language and culture data for each country and culture such as locale file 122 and scripts 124. Scripts 124 provide routines to process locale file 122 creating output portions used in later verification processing. Memory 108 is depicted conceptually as a single monolithic entity but it is well known that memory 108 can be arranged in a hierarchy of caches and other memory devices. FIG. 1 illustrates that operating system 120, locale file 122, scripts 124 and utilities 126, may reside in memory 108.

Operating system 120 provides functions such as device interfaces, memory management, multiple task management, and the like as known in the art. CPU 110 can be suitably programmed to read, load, and execute instructions of operating system 120, scripts 124 and instructions of utilities 126. Computer system 100 has the necessary subsystems and functional components to implement testing of locale files as will be discussed later. Other programs (not shown) include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology which may be used to depict test results. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM drive although other types of data storage devices can be used, including removable media for storing locale file 122 and the output of scripts 124.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

Figure 2:
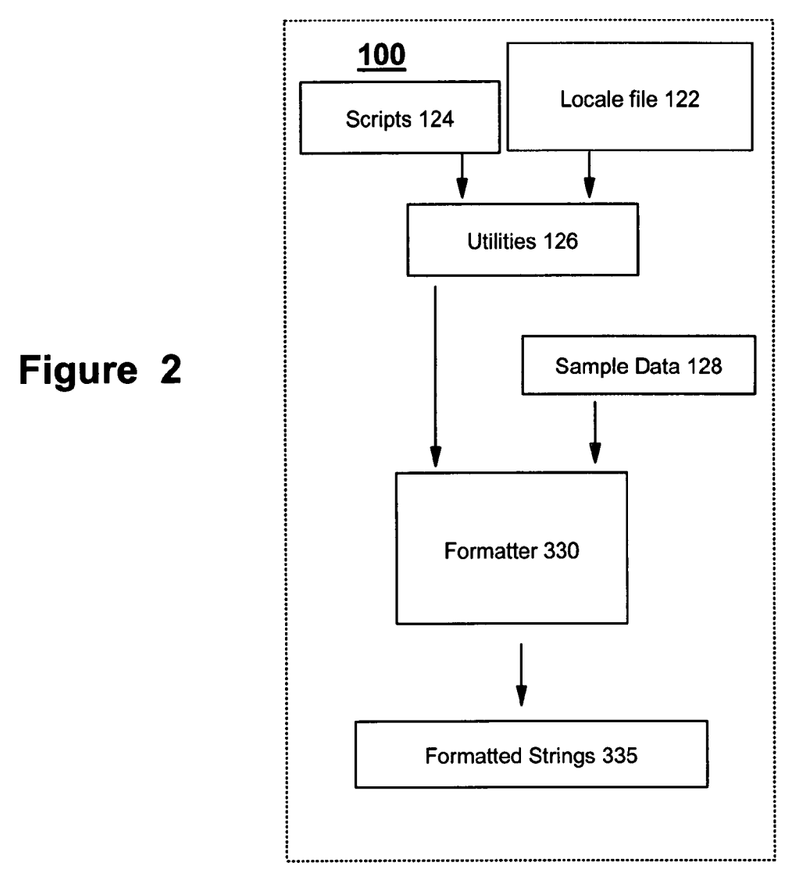
FIG. 2 is a block diagram of a high level view of components of an embodiment of the present invention.

Referring now to FIG. 2 may be seen a high level view of components as may be used in an embodiment of the present invention. Within system 100 of FIG. 1 may be found scripts 124 used in the processing of locale file 122, such as parsing. Utilities 126 as may be readily found in systems are used to augment and support scripts 124 providing an environment in which processing may be invoked, such as printing, comparing, appending, substring or concatenating operations. Sample data 128 is combined with extracted data and assembled by a formatter 330 to produce formatted strings 335 which may be tested or verified against predetermined values.

Figure 4:
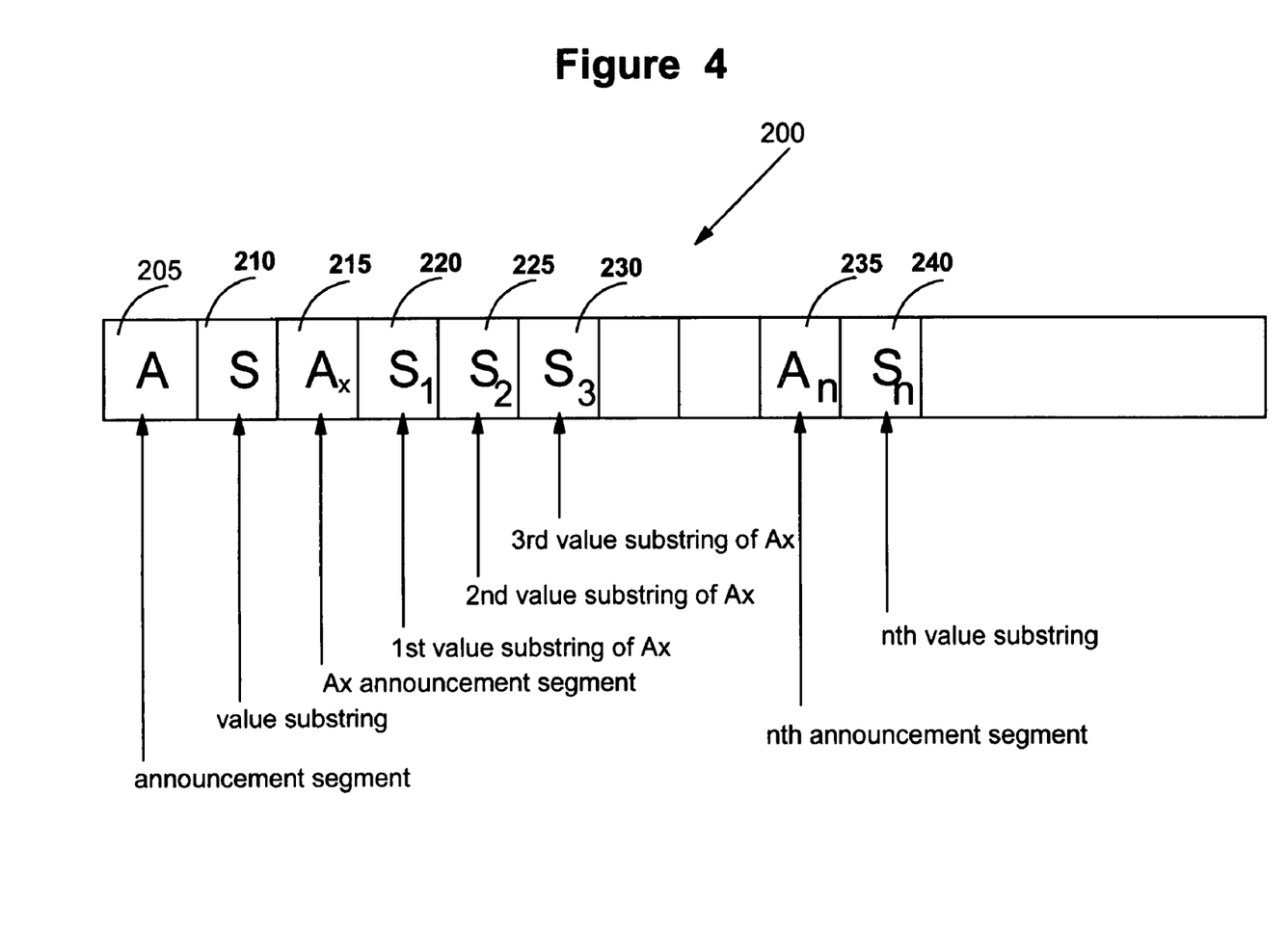
FIG. 4 is block diagram showing a stream of data elements of FIG. 3.

A fragment of an exemplary predefined stream oriented locale file is depicted in FIG. 4. An announcement segment is shown in general form as "A" followed by an associated value "S". An announcement segment "A" may be followed by one or more associated values as indicated by "$S_1$, $S_2$, $S_3$", wherein "$S_1$" is the first value substring, "$S_2$" is the second value substring and "$S_3$" is the third value substring. Each announcement string is of the form "/\*ABC\*/" (without the quotation marks) with an associated value immediately following. Typically locale files follow this announcement mechanism but a file may also be without such conventions. In a one embodiment of the invention a file adhering to these conventions is presumed. The values associated with a particular announcement type are contained within quotation marks and demarcated by a comma. The number and variety of values is specific to a respective category within the locale file. Within a category, values are separated by a comma and may be further associated with comments related to the specific values therein.

Proper processing of the stream requires knowledge of the announcement strings as well as having the appropriate processing modules available for specific types of substrings within a category. In addition other resources may be required to handle situations requiring substitution of an input value by another value, for example a symbolic name look-up table or other form of referential resource to provide a replacement value for a specific input value.

Within the locale file, in general, a string is said to be "representable" if it can be displayed to a user. Another string format, known as "Unicode format" may be used for storing values. The Unicode form, <U+xxxx>, is a notational representation of the Unicode code point value for a given character where xxxx is the character code value within the Unicode specification. Unicode is the presumed coded character set form of the locale file of an embodiment of the present invention obviating the need for a separate character code identifier for each locale file. [*The Unicode Standard Version* 4.0, Addison-Wesley, Boston Mass. ISBN 0-321-18578-1]

Figure 8:
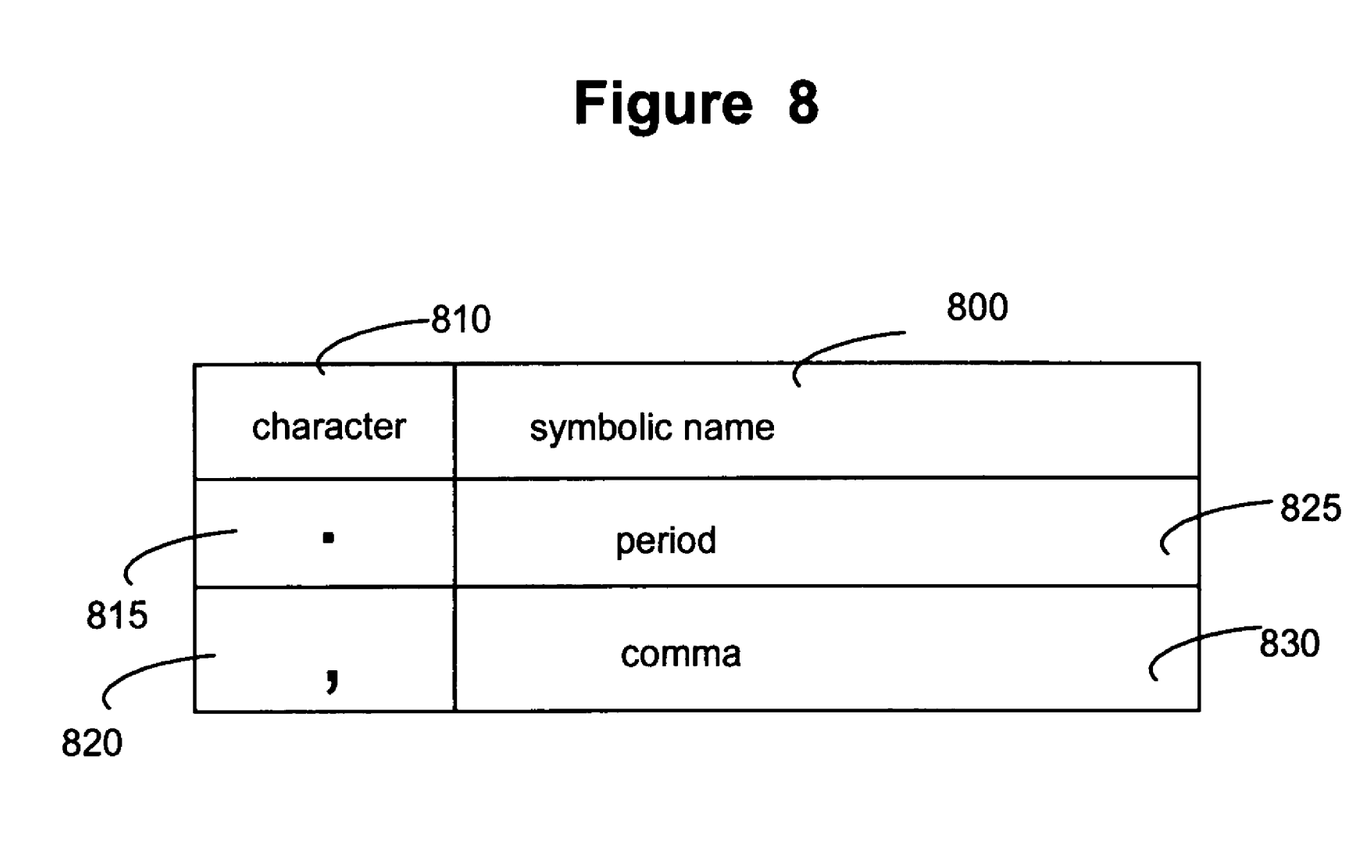
FIG. 8 is an example of decimal point replaced by symbolic name.

In cases where a symbolic name has been used in place of an actual character value, that syntactic character, as required by the format specification, has been replaced temporarily as an aid in further processing. The symbolic name removes any ambiguity as to the actual character needed in the locale of interest and allows more consistent, effective processing. The symbolic name representing the original character is later replaced through a table lookup, or similar means, with that of the desired character from the locale of interest in a form of late binding or just-in-time processing. See FIG. 8 for an example of decimal point replaced by symbolic name. In this example symbolic name 800 is a column heading for the symbolic names while character 810 is the column heading for the character representations. Character representation 815 shows a period with associated symbolic name of period 825. Character representation 820 shows a comma with associated symbolic name of comma 830. This simple example may be one form of lookup table used to resolved character representations to symbolic names. Other means such as comma-separated values, simple paired lists having a form of identifier and value pairing and database tables may be used as well.

Formatted output is enhanced for presentation to a verifier with additional information provided by using a template. The template provides a context of use to the value being shown. In the absence of such context, a user verifier may not know what a particular value represents or how it is being used. Programmatic verification also needs context of use of information. The context of use is typically in the form of descriptive text providing information such as a name "Currency symbol" or other indication of usage of the associated character or string presented. For example "Abbreviated name for day one of the week is" would be followed by the actual name value. [see example of text string and associated name value]

Figure 7:
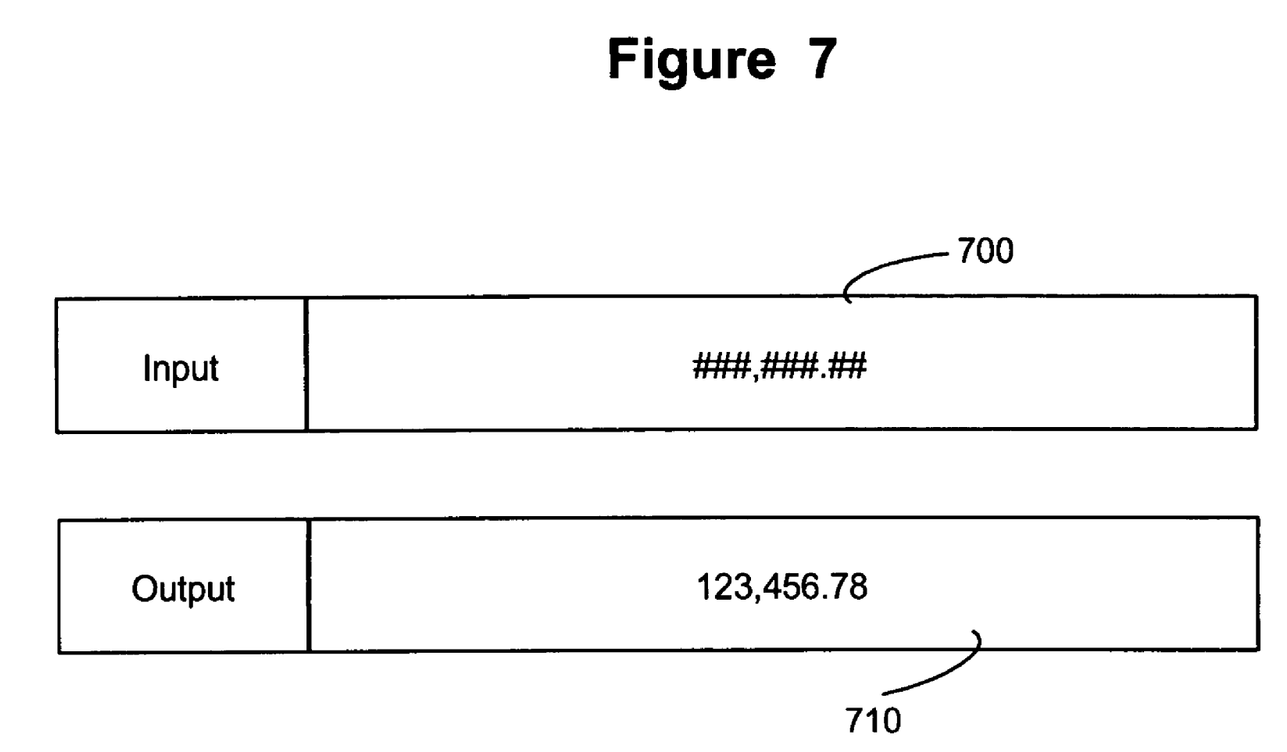
FIG. 7 is a text listing showing an input portion of locale file 122 of FIG. 1 and a corresponding output portion as used in an embodiment of the present invention.

FIG. 7 is an example of an input definition of a fragment of a numeric string as required by the Java specification. Reflecting a string in this picture form back to a user for verification may not be meaningful or helpful to the verifier and would not be useful for programmatic verification either. A more friendly form of output would be where Input 700 comprising "#" symbols is replaced with ordinary numbers and the separation characters are replaced with actual characters as required in the locale of interest. Output 710 has been formatted to replace the # from left to right by a sequence of numerals, the separator character "," (comma) and the radix character "." (decimal point) have been retained.

In an embodiment of the invention the process involves traversing the input stream while searching for values that announce the location of segments of interest. When such a segment is encountered a selection of an appropriate script resource is made. The chosen script resource is optimized for the particular type of segment and entries within that segment to be processed. For example, in an embodiment of the invention, to process a date and time segment, upon locating such a segment, one of a plurality of possible script modules may be invoked dependent upon the particular segment being processed. In an embodiment described herein related to operation 310 of FIG. 5 multiple differing modules were used to provide selective processing according to the type of segments encountered more or less granularity of processing support may be implemented as required.

Standard utilities (as in utilities 126 of FIG. 1) available on platforms are used in conjunction with the scripts. Standard utilities used include those for substring, case mapping, Unicode conversion, string and character comparison and table lookup operations. Comparisons may involve a user verifier or may be programmatic in nature using a comparator in conjunction with reference data. Usual comparators providing bitwise comparisons as is common on systems may be used by processing described herein.

An exemplary process of an embodiment of the present invention consists of a series of operations which may be broadly described as follows: "prepare", "present", "compare" and "change/accept" and further depicted in FIG. 5. A "prepare operation" obtains source data, analysing and invoking appropriate scripts to produce an output or intermediate portion which is stored for later use. A "present operation" uses the stored output portion from the "prepare operation" in combination with sample data and templates, as required by the segment being processed, to produce a formatted string used as a basis for later comparison. A "compare operation" uses the generated formatted string in comparison against a reference string. A comparison is performed either by a user visually or by programmatic means. In the case of a user visual comparison, the user has inherent knowledge of a reference string and the formatted string is presented visually. In a programmatic comparison the formatted string is compared with a previously stored reference string for pattern matching. In a "change/accept operation", previous output may be either accepted as correct or requiring a change. If a change is required, one is provided to the "prepare operation" to initiate further review and acceptance.

Figure 6:
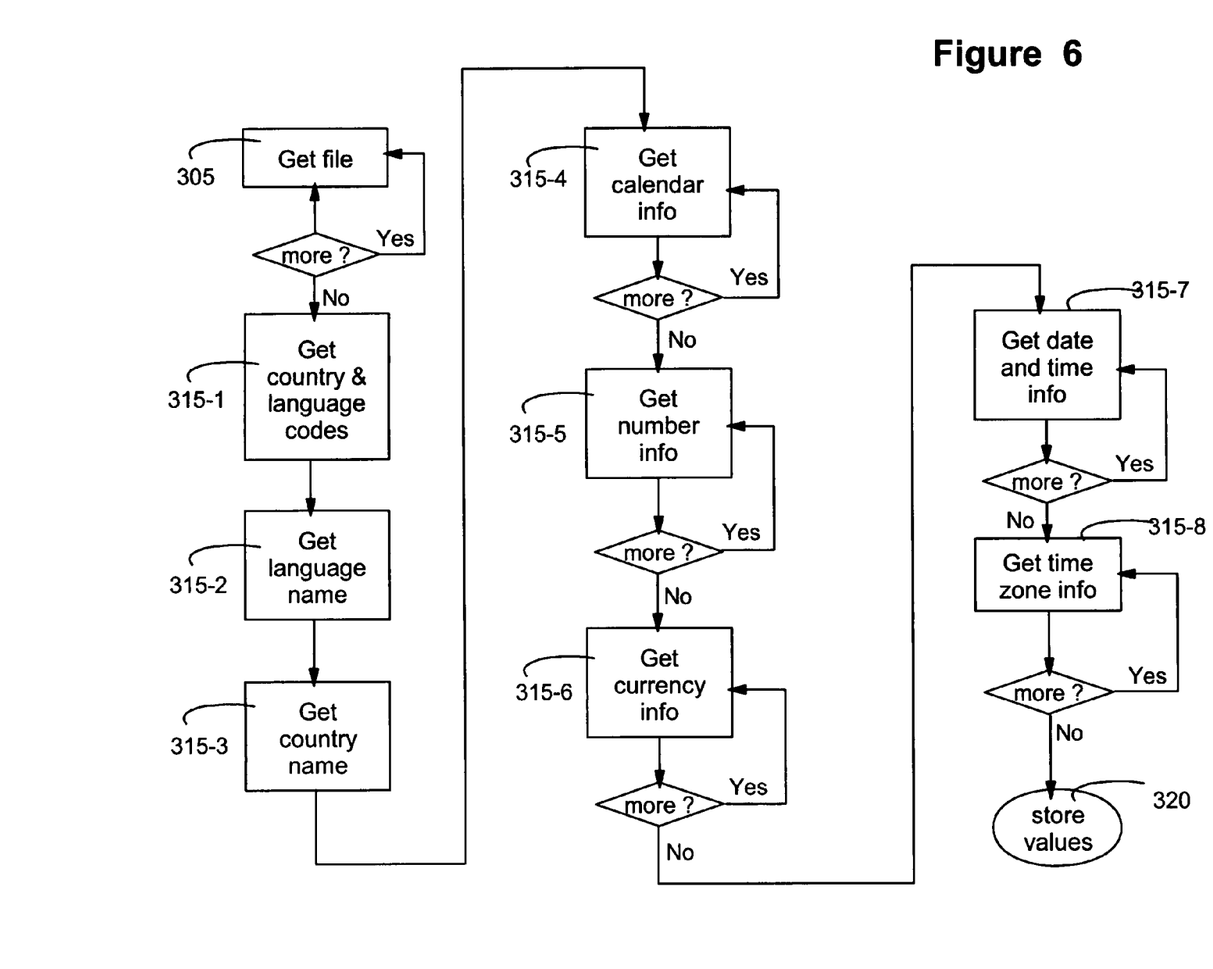
FIG. 6 is a flow diagram of a detail view of a portion of the process of FIG. 5.

The "prepare process" pulls the resource specifications out of the Java syntax and environment and into a simple text form for review, as depicted in FIG. 6. Output fields are used to store the collection results of the prepare process in a combination of name-value pairs. Changes as required from a review are first applied to the stored name-value pairs rather than being directed to the locale file itself, and reviewed again for acceptance. Upon acceptance of the change the change is then propagated to the locale file.

Script modules which process the locale file input use string segment identifiers or announcement strings to indicate what is to be processed. Obtaining a match confirms what type of value is to be processed and allows the main routine to selectively and more correctly process the associated values.

Figure 3:
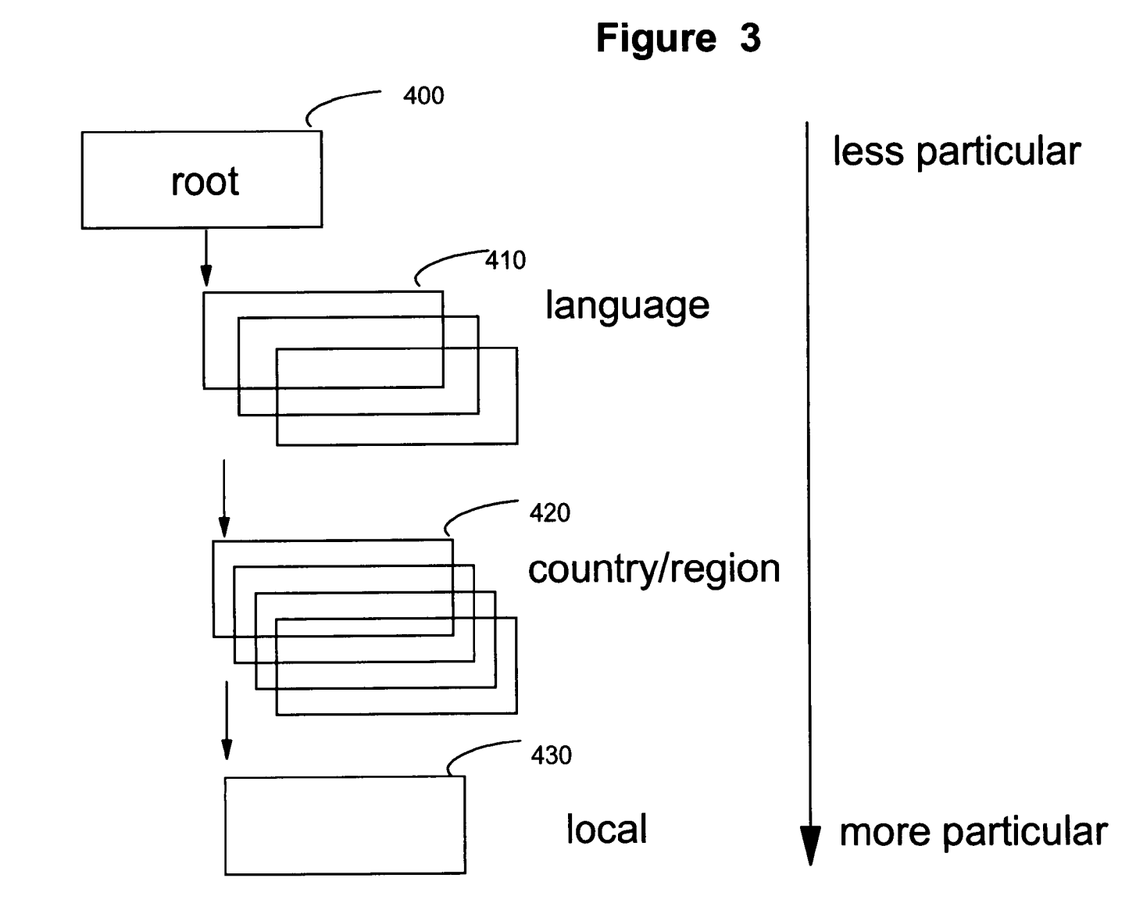
FIG. 3 is a block diagram illustrating a logical hierarchy of data elements in locale file 122 of FIG. 1.

The result of processing is a hierarchical collection of values. The highest level is the root 400 or locale identifier for the whole collection. The next level is the various segment identifiers such as language 410 and country/region 420 and finally the associated substrings and related values of the local 430 as seen in FIG. 3. The defaulting mechanism for traversing the hierarchy is beyond the scope of this present discussion. As is known in the art, elements missing from lower levels of the hierarchy are defaulted to elements found in the higher levels. For example if the currency symbol for the local element was not found (which would be typical) a higher level search would retrieve a country element for currency symbol.

Figure 5:
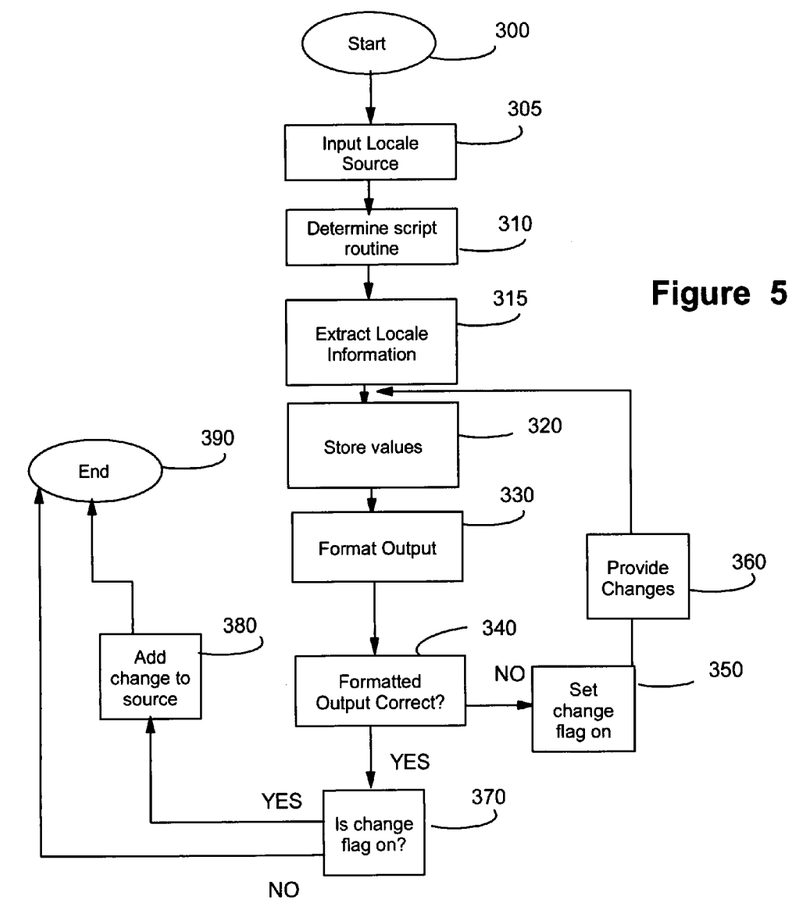
FIG. 5 is a flow diagram showing an overview of the process used with the stream of FIG. 4.

Referring to FIG. 5 is a flow diagram depicting an overview of the process incorporated in an embodiment of the invention performed on an exemplary system of FIG. 1.

The process begins in operation 300 with obtaining locale file 122 of FIG. 1. If there is more than one input file they are merged. For example a base locale file may be supplemented with additional files. A supplemental file may have a portion of a locale that overrides a portion of a base locale file or it may be in addition to the content of the base locale file. Once obtained and merged if necessary, a scripting operation 310 is performed to extract relevant portions of locale file 122. Having extracted specific values in operation 310, these values are then stored in a memory during operation 320 in a predetermined form for later use. A formatting operation is performed in operation 330 combining the stored values resulting from operations 310 and 320 with sample data and format templates retrieved from a memory location to produce formatted strings (see example of formatted strings discussed later). During operation 340 the formatted strings are compared with reference values. The reference values may have been previously stored, or be inherently known to a verifying user. If the comparison during operation 340 produce unfavourable results, processing moves to operation 350 wherein a change flag is turned on. Having turned on a change flag in operation 350, any required change deemed necessary as a result of the comparison in operation 340 is then made to the previously stored values by storing the changed value during operation 320 as before.

Otherwise, if the results of comparison operation 340 produce favourable results, processing is then directed to operation 370 wherein a determination is made regarding the setting of the change flag. If the flag is on, processing moves to operation 380 wherein the change is then made to locale file 122 itself with processing moving to end in operation 390. If, on the other hand, the change flag was not found to be on in operation 370 then processing would have been directed to end in operation 390 without further update to locale file 122.

Details of scripting operation 310 will now be described. Scripting operation 310 uses a readily available scripting facility as is known in the art. Scripting is a form of programming, which is powerful yet convenient and independent of the locale file 122 environment. The scripting functions are knowledgeable of the predefined syntax of locale file 122 and are able to iterate through the file invoking various process modules (other specialized scripts) to perform selective actions dependent upon respective portions. For example, an input portion of locale file 122 is typically announced according to convention using a comment string of the form "/*ABC*/" (without quotation marks) wherein the string is delimited by a combination of forward slashes and asterisks. Contained within, is the actual announcement string represented by "ABC", a descriptor of the usage context or type of values that may follow such as: Country and Language Information, Codeset and Keyboard Information, Currency Information, Number Information, Date and Time Information, Timezone Information, Calendar Information, Holiday Information, Responses given, Telephone Information, Cardinal Point Information, and Weights and Measures.

Dependent on the usage context or type of value being processed a respective module or scripting function is invoked to process the associated string of data. The string of data is composed in a comma-separated values format as is known in the art. In a first case, the string data is extracted and stored without modification. In a second case the string data may be replaced by a value obtained from a table lookup. An example of a second case is where a string data contained a character representation used as a decimal separator. A script routine would replace that character representation with the symbolic name "period" and store that symbolic name in memory associated with the instance of decimal separator as in operation 320. When formatting a sample string for output, as in operation 330, the symbolic name would then be resolved to the native language character symbol specific to the locale.

For example, knowing the type of segment being processed and using as a first case, to obtain abbreviated weekday names, the locale file is processed to locate the target string "/*abb monday*/" within the stream file. Finding such a string, the adjacent text immediately following is then taken and any quotation marks removed. Next it is determined if the string is representable (meaning can it be displayed as is). If the string is representable, it is saved in a field named "NTV_Abbreviated_Mon" and "U_NTV_Abbreviated_Mon", replacing all non-alphanumeric characters by corresponding Unicode values in the "U_NTV_Abbreviated_Mon" field. Otherwise, enter "N/D" in to the field "NTV_Abbreviated_Mon" and place a properly constructed Unicode string in "U_NTV_Abbreviated_Mon". Here proper construction is in the form of "<U+xxxx>" (without the quotes). Repeat the procedure for the remaining days of the week to capture all of the abbreviated names from that segment of the locale file.

In a second case, using number information, find the string "/* decimal pattern */" in the source file and take the character string immediately following. Strip off any quotation marks and break the remaining string into two substrings using the semicolon as a separator. The use of semicolon separated strings is found in only the format for monetary and numeric strings. For each of the substrings, count each occurrence of the "#" character found after the decimal separator. Compare each character found against the previous to determine if they are the same. If they compare equal, then enter the count value into the field "Numeric_Digits_After_Decimals", otherwise stop and raise an error flag. In a similar manner count the number of occurrences of the "#" character found between the decimal and thousand separators. Likewise compare each character to the previous and if equal then place the count in a field "Numeric_Grouping". If the compare is not equal, then stop and raise an error flag. Next create a duplicate of each substring found. Replace each of the "#" characters with a digit 0-9. Place the transformed result of the first substring into a field "Numeric_Positive_Format" and the result from the transform of the second substring into field "Numeric_Negative_Format".

Referring now to FIG. 6 there is provided further detail of operations 305, 310, 315 and 320 of FIG. 5. Beginning with operation 305 one or more locale files are obtained and in operation 310 (not shown) a determination is made with regard to the existence of more than one file. If it is determined that more than one file exists the files are merged causing section of the files to be combined (may be overridden, may be merged, may be additions) and the resultant file passed to operation 315-1.

In each of the operations having associated sub operations (315-4, 315-5, 315-6, 315-7 and 315-8) a determination is made regarding the need to iterate through the sub operations to complete the segment processing. Two criteria are used: are there more sub operations within the operation to perform, and is there a need to restart the operation, such as in the time zone case to process additional time zones as compared to not just more information within the time zone being processed. Sub operations are noted by the "-xx" appended to operations labelled 315-x and are still operations in their own right, but are included within a collection of related operations. The description that follows uses the term operation for both operations and sub operations.

During operation 315-1, find the string /* locale id based on ISO codes */ in the locale file. Get the string immediately after it and Strip off the quotation marks. Break the string into two substrings using _ (underscore) as the separator. Convert the first substring to lower case if it's not already in lower case and cross-reference it with the ISO 639.1 Language Code. If they are the same, enter the language code into the field called "ISO 639.1 Language Code"; otherwise, raise flag and stop. Similarly, convert the second substring to uppercase if it's not already in upper case and cross-reference it with the ISO 3166 Country Code. If they are the same, enter the country code into the field called "ISO 3166 Country Code"; otherwise, raise flag and stop.

Having performed operation 315-1 successfully, processing moves to operation 315-2 during which a search is performed to find the string /* language names */ in the locale file. Once found, get the string immediately after it and strip off the quotation marks. Break the string into two substrings, this time using the semicolon (;) as the separator. If no semicolon exists, leave the string untouched and return it as one substring. For each substring, extract the string preceding the _ (underscore). If the string and the language code are equal to en, then extract the string after the underscore character and enter it into the following fields: "Official_Language_Name", "NTV_Language_Name" and "U_NTV_Language_Name". For the last field, all non alpha numeric characters are replaced by their Unicode values. If the string is equal to en but not the language code, then extract the string after the _ (underscore) and enter it into the field called "Official_Language" alone. If the string is not en but the language code instead, then extract the string appearing after the _ (underscore). If this string is representable (i.e. it does not contain any Unicode values in it), then enter this string into the fields called "NTV_Language_Used" and "U_NTV_Language_Used". For the second field, make sure to replace all the non alpha numeric characters by its Unicode value. However, if the string is not representable (i.e. it contains Unicode values), then enter "N/D" into the first field (i.e. "NTV_Language_Used") and the string into the second field. Note if the Unicode value in the string is not of the form <U+xxxx> where xxxx is the four letter code point assigned by the Unicode Consortium, then convert them to the required form before entering into the field and move to operation 315-3.

During operation 315-3, a search is performed to find the string /* country names */ in the locale file. Having found the names string, get the string immediately after it and strip off the quotation marks. Break the string into two substrings, with the semicolon serving as the separator. If no semicolon exists, leave the string in its original format and return it as one substring. For each substring, extract the string preceding the _ (underscore) character. If the string is equal to en, and also the language code at the same time, then extract the string after the underscore character and enter it into the following fields: "Official_Country_Name", "NTV_Country_Name" and "U_NTV_Country_Name". For the last field, all non alpha numeric characters are replaced by their Unicode values. If the string is en but not equal to the language code, then enter the string appearing after the _ (underscore) into the field called "Official_Country_Name" alone. If the string is not en but equal the language code instead, then extract the string after the underscore character as before and determine from the string whether or not it is representable (i.e. does it contain any Unicode values in it?) If it is representable, then enter the string into the fields called "NTV_Country_Name" and "U_NTV_Country_Name". For the latter field, all non alpha numeric characters are replaced by their Unicode values. However, if the string is not representable, then enter the value "N/D" into the first field "NTV_Country_Name" and the Unicode equivalent of the string into the field called "U_NTV_Country_Name". Then move to operation 315-4.

During operation 315-4, calendaring information is obtained using a series of sub operations as needed. During operation 315-41, find the string /* january */ in the locale. Get the string immediately after it and strip off the quotation mark. Determine if the string is representable or not (i.e. Does it contain any Unicode values?). If it does, enter N/D into the field called "NTV_January" and the string into field called "U_NTV_January". Note before entering the string into the field "U_NTV_January", make sure the Unicode values are of the form <U+xxxx> where xxxx is the 4 letter code point of that character. If the string is representable (i.e. it does not contain any Unicode value), then enter the whole string into the fields called "NTV_Januaray" and "U_NTV_January". Note for the second field, all non alpha-numeric characters are replaced by their Unicode values. Repeat this same procedure for the other month names.

During operation 315-42, find the string /* abb january */ in the locale. Get the string immediately after it and strip off the quotation mark. Determine if the string is representable or not. If it is, enter the whole string into the fields called "NTV_Abbreviated_Jan" and "U_NTV_Abbreviated_Jan" with all the non alpha-numeric characters replaced by their Unicode values for the last field. If it's not representable, then enter the value N/D into the field called "NTV_Abbreviated_Jan" and the string formatted in the proper form into the field called "U_NTV_Abbreviated_Jan". Repeat the same operation for the other month names.

During operation 315-43, find the string /* monday */ in the locale. Get the string immediately after it and strip off the quotation mark. Determine if the string is representable or not. If it is, enter the whole string into the fields called NTV_Monday" and "U_NTV_Monday" with all the non alpha-numeric characters replaced by their Unicode value in the last field. If it's not, enter the value N/D into the field, "NTV_Monday", and the string, properly formatted, to the field called "U_NTV_Monday". Properly formatted, means the Unicode value must be of the following form <U+xxxx> where xxxx represents the 4 letter code point of the character. Repeat this operation for the other weekday names.

During operation 315-44, find the string /* abb monday */ in the locale. Get the string immediately after it and strip off the quotation mark. Determine if the string is representable or not. If it is, enter the string into the fields called "NTV_Abbreviated_Mon" and "U_NTV_Abbreviated_xxx" with all the non alpha numeric characters replaced by their Unicode value in the last field. If it's not, enter the value N/D into the field called "NTV_Abbreviated_Mon" and the string, properly formatted, to the field called "U_NTV_Abbreviated_Mon". Repeat this procedure for the other abbreviated weekday names.

During operation 315-45, find the string /* first day of week */ in the locale. Get the string immediately after it and strip off the quotation mark. Enter the value into the field called "Calendar_First_Day_Of_Week".

During operation 315-46, find the string /* min days in first week */ in the locale. Get the string immediately after it strip off the quotation mark. Enter the value into the field called "Calendar_DaysinFirstWeekOfYear".

During operation 315-5, the following sub operations handling numeric information are performed.

During operation 315-51, find the string /* decimal pattern */ in the locale. Get the string immediately after it and strip off the quotation mark. Break the string into two substrings, using the semicolon as the separator. For the each substring, count the number of # (pound or number sign) characters after the decimal separator separately and compare the results against each other. If they are the same, then enter the count value into the field called "Numeric_Digits_After_Decimals"; otherwise, raise flag and stop. Similarly, count the number of characters that exist between the decimal and thousand separator. Compare the result, if they are the same, enter the value into the field called "Numeric_Grouping"; otherwise, raise flag and stop. Create a duplicate of each substring, and replace all the # characters with arbitrary digits from 0 to 9. Enter the result obtained from the first substring into the field called "Numeric_Positive_Format" and the result from the second substring into the field called "Numeric_Negative_Format".

During operation 315-52, find the string /* decimal separator */ in the locale. Get the string immediately after it and strip off the quotation mark. Replace the separator character by its symbolic name and enter the name into the field called "Numeric_Decimal_Separator".

During operation 315-53, find the string /* group (thousands) separator */ in the locale. Get the string immediately after it and strip off the quotation mark. Replace the separator character by its symbolic name and enter the name into the field called "Numeric_Thousands_Separator".

During operation 315-54, find the string /* minus sign */ in the locale. Get the string immediately after it and strip off the quotation mark. Replace the negative sign with its symbolic name and enter the name into the field called "Numeric_Negative_Sign" field.

During operation 315-6, the following sub operations handling currency information are performed.

During operation 315-61, find the string /* currency pattern */ in the locale. Get the string immediately after it and strip off the quotation mark. Break the string into two substrings, using the semicolon as the separator. For each substring, count the number of 0's (zeros) after the decimal separator and compare the result. If they are the same, enter this value into the field called "Monetary_NAT_Digits_AfterDecimal". If they are not the same, raise flag and stop. Similarly, count the number of characters that exist between the decimal separator and the thousand separator. Compare the result. If they are the same, enter the value into the field called "Monetary_NAT_Grouping"; otherwise, raise flag and stop. Create a duplicate of each substring, and replace all the # character with arbitrary digits from 0 to 9. Enter the result for the first substring into the field called "Monetary_NAT_Positive_Format" and the result for the second substring into the field called "Monetary_NAT_Negative_Format".

During operation 315-62, find the string /* intl currency symbol */ in the locale. Get the string immediately after it and strip off the quotation mark. Extract the first three letter character from the string and enter them into the field called "Monetary_ISO4217_Alpha_Code".

During operation 315-63, find the string /* local currency symbol */ in the locale. Get the string immediately after it and strip off the quotation mark. Determine if the string is in Unicode form or not. If it is, enter the value N/D into the field called "Monetary_NTV_Currency_Symbol". At the same time, enter the properly formatted Unicode string into the field called "U_Monetary_NTV_Currency_Symbol". If the string is not in Unicode format, then enter the string into the field called "Monetary_NTV_Currency_Symbol". At the same time, replace the currency symbol by its Unicode equivalent and enter the value into the field called "U_Monetary_NTV_Currency_Symbol".

During operation 315-64, find the string /* monetary decimal separator */ in the locale. Get the string immediately after it and strip off the quotation mark. Replace the separator character by its symbolic name and enter the value into the field "Monetary_Decimal_Separator" field.

During operation 315-7, the following sub operations are performed dealing with date and time information.

During operation 315-71, find the string /* am marker; default is AM */ in the locale. Get the string immediately after it and strip off the quotation mark. If the string is empty, don't do anything and move on to the next field. However, if the string is not empty, then enter the NO into field called "Time_24 hr_Clock_Used". Determine from the string if it is in Unicode format or not. If it is, enter the value N/D into the field called "Time_NTV_Morning_String" field and the properly formatted string to the field called "U_Time_NTV_Morning_String". If the string is not in Unicode format, then enter the entire string into the fields called "Time_NTV_Morning_String" and "U_Time_NTV_Afternoon_String" with all the non alpha numeric characters replaced by their Unicode values in the last field.

During operation 315-72, find the string /* pm marker; default is PM */ in the locale. Get the string immediately after it and strip off the quotation mark. If the string is empty, then don't do anything and move on to the next field. If the string is not empty, then enter NO in the field called "Time_24 hr_Clock_Used". Determine from the string if it is in Unicode format or not. If it is, enter the value N/D into the field called "Time_NTV_Afternoon_string" and the properly formatted Unicode string into the field called "U_Time_NTV_Afternoon_String". If the string is not in Unicode format, then enter the entire string into the fields called "Time_NTV_Afternoon_String" and "U_Time_NTV_Afternoon_String" with all the non alpha numeric characters replaced by their Unicode values in the last field.

During operation 315-73, find the string /* Full time pattern */ in the locale. Get the string immediately after it and strip off the quotation mark. Parse the string to determine the location of the following characters: h, m, s, a and z. The meaning for these characters are: H: means hour (as in 01-24), M: means minute (as in 00-59), S: means second (as in 00-59), A: means morning/afternoon string and Z: means time zone name. Create a duplicate of the string just created, but with the characters replaced by their corresponding values in native language. If the character A appears in the string, then the range of valid values for H is reduced from 01-24 to 01-12. Enter the value into the field called "U_Time_NTV_Full_Format" with all the non alpha numeric characters replaced by their Unicode value. Determine if the duplicate string contains any Unicode value or not. If it does, enter N/D into the field called "Time_NTV_Full_Format"; otherwise, enter the string value instead without replacing the non alpha numeric characters by their Unicode values. Create another duplicate of the first parsed string but with the characters replaced by their corresponding values in native language. If there are any Unicode value in the string, translate them into the English and enter the resulting string into the field called "Time_Full_Format".

During operation 315-74, find the string /* Default time pattern */ in the locale. Get the string immediately after it and strip off the quotation mark. Repeat five steps parsing, creating, entering, determining and creating from the Full Time Format section, but with the corresponding field names changed.

During operation 315-75, find the string /* Short time pattern */ in the locale. Get the string immediately after it and strip off the quotation mark. Repeat the five steps parsing, creating, entering, determining and creating from the Full Time Format section, but with the corresponding field names changed.

During operation 315-76, find the string /* Full date pattern */ in the locale. Get the string immediately after it and strip off the quotation mark. Parse the string to determine the location of the following substrings: EEEE, MMMM, d and YYYY. The meanings of these substrings are as follows: EEEE: represents day of the week, MMMM: represents month of the year, d: represents date of the month, and YYYY: represents the year. Create a duplicate of the string just parsed, with all the substrings replaced by their corresponding values in native language. If the native language can not be rendered, use Unicode values instead. Determine if the duplicate string contains any Unicode values. If it does, enter N/D into the field called "Date_NTV_Full_Format" and the resulting string in to the field called "U_Date_NTV_Full_Format" with all non alphanumeric characters replaced by their Unicode value. Create another duplicate of the just parsed string and replace all substrings by their corresponding values in English. Enter this string into the field called "Date_Full_Format".

During operation 315-77, find the string /* Long date pattern */ in the locale. Get the string immediately after it and strip off the quotation mark. Repeat the four steps of parsing, creating, determining and creating a second duplicate string from the Full Date Format section, but with the corresponding field names changed accordingly to "Long_Date_Format".

During operation 315-78, find the string /* Default date pattern */ in the locale. Get the string immediately after it and strip off the quotation mark. Repeat the four steps of parsing, creating, determining and creating a second duplicate string from the Full Date Format section, but with the corresponding field names changed accordingly to "Long_Date_Format".

During operation 315-79, find the string /* Default date pattern */ in the locale. Get the string immediately after it and strip off the quotation mark. Repeat the four steps of parsing, creating, determining and creating a second duplicate string from the Full Date Format section, but with the corresponding field names changed accordingly.

During operation 315-7A, find the string /* Short date pattern */ in the locale. Get the string immediately after it and strip off the quotation mark. Repeat the four steps parsing, creating, entering and determining from the Full Date Format section, but with the corresponding field names changed accordingly.

During operation 315-7B, find the string /* Date-Time pattern */ in the locale. Get the string immediately after it and strip off the quotation mark. Parse the string to determine the ordering of % 1 and % 0. If % 1 appears first, enter the string "Date+Time" into the field called "Date_And_Time_Format" to indicate that the date format comes before the time format in the Date and Time format; otherwise, enter "Time+Date" to mean the reverse.

During operation 315-8, the following sub operations are performed dealing with time zone information.

During operation 315-81, find the string /* Abbreviated timezone name */ in the locale. Get the string immediately after it and strip off the quotation mark. If the string is empty, then do nothing; otherwise enter the resulting string into the fields called "Timezone_Short_Name_x", "Timezone_NTV_Short_Name_x", and "U_Timezone_NTV_Short_x", where x represents the ith timezone.

During operation 315-82, find the string /* GMT Offset */ in the locale. Get the string immediately after it, strip off the quotation mark and enter the value into the field called "Timezone_Offset_x" where x represents the ith timezone.

During operation 315-83, find the string /* Daylight savings delta */ in the locale. Get the string immediately after it and strip off the quotation mark after it. If the string is empty, enter "NO" into the field called "Timezone_DST_Used_x" where x represents the ith timezone. If the string is not empty, enter "YES" into the field called "Timezone_DST_Used_x" and the string into the field "Timezone_DST_Offset_x".

During operation 315-84, find the string /* Abb. daylight-savings name */ in the locale. Get the string immediately after it and strip off the quotation mark. If the remaining string is empty, then stop; otherwise, enter the string value into the field called "Timezone_DST_Shortname_i" where "I" represents the ith timezone.

During operation 315-85, find the string /* Full timezone name */ in the locale. Get the string immediately after it and strip off the quotation mark. If the remaining string is empty, then stop; otherwise, enter the string value into the field called "Timezone_Fullname_i" where "I" represents the ith timezone.

During operation 315-86, find the string /* Full daylight-savings name */ in the locale. Get the string immediately after it and strip off the quotation mark. If the remaining string is empty, then stop; otherwise, enter the string value into the field called "Timezone_DST_Fullname_i" where "I" represents the ith timezone.

During operation 315-87, find the string /* Representative City in timezone */ in the locale. Get the string immediately after it and strip off the quotation mark. If the remaining string is empty, then stop; otherwise, enter the string value into the field called "Timezone_Representative_City_i" where "I" represents the ith timezone.

During operation 315-88, find the string /* Start month */ in the locale. Get the string immediately after it and strip off the quotation mark. If the remaining string is empty, then don't do anything and move on to the next field; otherwise enter the string value into the field called "Timezone_DST_StartMonth_i" where "I" represents the ith timezone.

During operation 315-89, find the string /* Start date in month */ in the locale. Get the string immediately after it and strip off the quotation mark. If the remaining string is empty, then don't do anything and move on to the next field; otherwise enter the string value into the field called "Timezone_DST_StartDate_i" where "I" represents the ith timezone.

During operation 315-8A, find the string /* Start day-of-week in month */ in the locale. Get the string immediately after it and strip off the quotation mark. If the remaining string is empty, then don't do anything and move on to the next field; otherwise enter the string value into the field called "Timezone_DST_StartWeek_i" where "I" represents the ith timezone.

During operation 315-8B, find the string /* Start day-of-week */ in the locale. Get the string immediately after it and strip off the quotation mark. If the remaining string is empty, then don't do anything and move on to the next field; otherwise enter the string into the field called "Timezone_DST_StartDay_i" where "I" represents the ith timezone.

During operation 315-8C, find the string /* End month */ in the locale. Get the string immediately after it and strip off the quotation mark. If the remaining string is empty, then don't do anything and move on to the next field; otherwise enter the string into field called "Timezone_DST_EndMonth_i" where "I" represents the ith timezone.

During operation 315-8D, find the string /* End date in month */ in the locale. Get the string immediately after it and strip off the quotation mark. If the remaining string is empty, then don't do anything and move on to the next field; otherwise, enter the string into the field called "Timezone_DST_EndDate_i" where "I" represents the ith timezone.

During operation 315-8E, find the string /* End day-of-week in month */ in the locale. Get the string immediately after it and strip off the quotation mark. If the remaining string is empty, then don't do anything and move on to the next field; otherwise, enter the string into the field called "Timezone_DST_EndWeek_i" where "I" represents the ith time zone.

During operation 315-8F, find the string /* End day-of-week */ in the locale. Get the string immediately after it and strip off the quotation mark. If the remaining string is empty, then don't do anything and move on to the next field; otherwise, enter the string into the field called "Timezone_DST_EndDay_i" where "I" represents the ithe time zone.

Repeat these sub operations 315-81 through 315-8F for other time zones as necessary.

The following is an example of formatted output. The values Albania, AL, Albanian, sq, Shqipëri and Shqip were taken directly from the resource file and stored without change by the scripting function designed to handle portions such as the country and language information. The UCS-2 values were created in this example by the scripting function from the input source provided, as the source did not provide data in that form. If the source provided the Unicode values they would have been used directly.

The following is a country and language segment of a first portion of a locale file having had information captured, processed and formatted output created as may be used in a verification process. Programmatic verification may use the identifying strings of the description to indicate the context of use of the respective values.

> This section details the country name and language.
> ISO3166 Country/Region Name: Albania
> ISO3166 [2 letter] Country Code: AL
> Language Name (ISO639.1): Albanian
> ISO 639.1 Language Code: sq
> Country Name in Native Language: Shqipëri UCS-2 Value Shqip<U+00cb>ri
> Language Name in Native Language: Shqip UCS-2 Value Shqip
> IBM ID (3 Letter Code): SQI
> Other relevant information: None The use of the Unicode value <U+00cb> in the Country Name is to specifically state the character code value for the accented "e" character in the name string in an unambiguous manner. The Language Name string is contained completely within the ASCII character set leaving no character values ambiguous, therefore no use of Unicode characters is required. During the format operation message text such as "Country Name in Native Language:" "UCS-2 Value" is provided as part of a resource template into which is inserted, in predefined locations, the results of an extract operation for the particular segment relating to country name. Providing this context of use information is helpful to the verifier as well in programmatic cases to make certain what is being evaluated.

The following is an example of numeric information which has been collected from a locale file and processed in accordance with an embodiment of the present invention. The example shows a form of data presentation which may be useful to a user during verification. Context of use descriptions aid in proper understanding of what is being verified.

NUMBER INFORMATION

Description
  This section details numeric formatting elements.
  Numeric Formatting Data:
  Description (Positive Format)
    Depict the value one million, two hundred and thirty four thousand, five hundred and sixty seven with eight nine as the decimal component showing any marks to depict positive quantities.
      e.g. "1,234,567.89" in Canada.
    Positive Format 1.234.567,89
  Description (Negative Format)
    Depict the value one million, two hundred and thirty four thousand, five hundred and sixty seven with eight nine as the decimal component showing any marks to depict negative quantities.
      e.g. "−1,234,567.89" in Canada.

| Negative | Format | −1.234.567,89 |
|---|---|---|
| Positive | Sign | none |
| Negative | Sign | hyphen |
| Leading | Zeros | Yes |
| Thousands' | Separator | period |
| Decimal | Separator | comma |
| Digits After Decimal | | 2 |
| Grouping | | 3 |

Other relevant information
  None

The process is repeated for each category of locale file 122 until all elements have been processed. Intermediate results may be stored in any form as is known in the art providing suitable retrieval such as but not limited to, arrays, vectors, tables and simple paired lists.

Although the invention has been described with reference to illustrative embodiments, it is to be understood that the invention is not limited to these precise embodiments, and that various changes and modifications may be effected therein by one skilled in the art. All such changes and modifications are intended to be encompassed in the appended claims.

What is claimed is:

1. A computer implemented method for preparing a plurality of stream oriented locale files for verification, said method comprising:
  obtaining at least one of said plurality of stream oriented locale files as input;
  determining more than one of said plurality of stream oriented locale files exist;
  responsive to a determination that more than one of said plurality of stream oriented locale files exist, merging said more than one of said plurality of stream oriented locale files into one stream oriented locale file, wherein the plurality of stream oriented locale files comprise a base stream oriented locale file and a supplemental stream oriented locale file and the supplemental stream oriented locale file overrides a portion of the base stream oriented locale file;
  locating a respective portion of said stream oriented locale file;
  creating an output portion from said respective portion by selectively invoking a process based on said respective portion, wherein the process is a script;
  storing said output portion in a memory, wherein output portion comprises a context of use string;
  formatting said output portion, stored in said memory, into a formatted string for output, wherein said step of formatting said output portion further comprises:
    obtaining a sample data adapted for said output portion;
    obtaining a template adapted for said sample data and said output portion; and
    formatting said output portion in conjunction with said sample data and said template to create said formatted string; and wherein processing said respective portion further comprises:
      replacing a character representation with a symbolic name; and
      storing said symbolic name in a memory associated with an instance of said character representation;
  comparing said formatted string with a reference data using computer-readable program code and using a user visually comparing said formatted string to a reference data;
  selectively updating said stored output portion in said memory and initializing a change indicator as indicated by said comparison; and
  selectively updating said stream oriented locale file as indicated by said change indicator.

2. The computer implemented method of claim 1 wherein said output portion is a hierarchy comprising a locale identifier and at least one segment identifier.

* * * * *

UNITED STATES PATENT AND TRADEMARK OFFICE
CERTIFICATE OF CORRECTION

PATENT NO. : 7,627,858 B2
APPLICATION NO. : 10/875851
DATED : December 1, 2009
INVENTOR(S) : Rose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Second Day of November, 2010

David J. Kappos
*Director of the United States Patent and Trademark Office*